(12) United States Patent
Miah

(10) Patent No.: US 8,437,917 B2
(45) Date of Patent: *May 7, 2013

(54) VEHICLE LAUNCH ANTICIPATION AND ADAPTATION

(75) Inventor: Sayid Miah, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

This patent is subject to a terminal disclaimer.

(21) Appl. No.: 12/917,590

(22) Filed: Nov. 2, 2010

(65) Prior Publication Data

US 2011/0144876 A1    Jun. 16, 2011

(51) Int. Cl.
| | |
|---|---|
| *F02D 9/00* | (2006.01) |
| *F02D 41/00* | (2006.01) |
| *B60W 10/18* | (2006.01) |
| *F02B 37/00* | (2006.01) |
| *F02D 23/02* | (2006.01) |
| *F02D 13/00* | (2006.01) |

(52) U.S. Cl.
USPC ............... 701/48; 701/70; 701/100; 701/101; 701/116

(58) Field of Classification Search .................... 701/36, 701/48, 70, 99–116
See application file for complete search history.

(56) References Cited

U.S. PATENT DOCUMENTS

| | | | | |
|---|---|---|---|---|
| 4,981,017 | A | * | 1/1991 | Hara et al. ........................ 60/608 |
| 5,064,423 | A | * | 11/1991 | Lorenz et al. .................... 60/611 |
| 5,529,548 | A | * | 6/1996 | Mack .............................. 477/84 |
| 5,771,695 | A | | 6/1998 | Halimi |
| 5,906,098 | A | | 5/1999 | Woollenweber |
| 6,219,611 | B1 | | 4/2001 | Russell |
| 6,547,344 | B2 | | 4/2003 | Hada et al. |
| 7,182,412 | B2 | | 2/2007 | Ogawa |
| 8,086,391 | B2 | * | 12/2011 | Miah ............................. 701/113 |
| 2002/0062815 | A1 | | 5/2002 | Kim |
| 2003/0140905 | A1 | * | 7/2003 | Nau et al. .................... 123/559.3 |
| 2007/0050118 | A1 | | 3/2007 | Murray |
| 2009/0157270 | A1 | * | 6/2009 | Frauenkron et al. ............ 701/54 |
| 2010/0280738 | A1 | * | 11/2010 | Whitney et al. ............... 701/102 |
| 2011/0144884 | A1 | * | 6/2011 | Miah ............................. 701/102 |

FOREIGN PATENT DOCUMENTS

| | | |
|---|---|---|
| KR | 20040031221 A | 4/2004 |
| KR | 20040041423 A | 5/2004 |

* cited by examiner

*Primary Examiner* — Khoi Tran
*Assistant Examiner* — Dale Moyer
(74) *Attorney, Agent, or Firm* — O'Brien Jones PLLC; Ray Coppiellee

(57) ABSTRACT

A launch interval is determined for a vehicle based on the time that the operator takes to move a foot from the brake pedal to the accelerator pedal for launching the vehicle from a stopped condition. Such launch interval may be determined for multiple launches to determine to determine an average launch interval. During the launch interval, actions can be taken to prepare the engine and/or turbocharger to launch the vehicle once the operator has called for such a launch by depressing the accelerator pedal. The magnitude of the actions taken and/or the rate at taking such actions can be based on the launch interval, i.e., whether the operator tends to move rapidly or slowly from brake pedal to accelerator pedal. The vehicle may base the rate of the actions on the driving style of the particular driver currently driving the vehicle.

18 Claims, 5 Drawing Sheets

VEHICLE LAUNCH ANTICIPATION AND ADAPTATION

BACKGROUND

1. Technical Field

The present disclosure relates to improving the launch performance of a vehicle.

2. Background Art

It is known that a vehicle with a smaller displacement engine exhibits greater fuel efficiency than the same vehicle with a larger displacement engine. However, the ability of the vehicle to accelerate is impaired by the smaller displacement inducting less air into the engine to thereby produce power. It is also known that by pressure charging the engine, performance of the smaller displacement engine, at many operating conditions, can be similar to that of the larger displacement engine. More commonly, pressure charging is provided by a turbocharger in which exhaust enthalpy, which would otherwise be exhausted, is recovered as work in an exhaust turbine. The exhaust turbine has a common shaft with a compressor in the intake. The work extracted in the exhaust turbine is used to compress the intake gases to improve power density of the engine. Turbo lag is a known disadvantage of a turbocharged engine. That is, at low engine speed, such as at vehicle launch, little mass is flowing through the engine so that the exhaust turbine spins at a low speed. The engine/turbo system spins up when demanded by the vehicle operator by depressing the accelerator pedal, however with an undesirable delay. If turbo lag could be addressed, fuel efficiency of vehicles could be significantly improved by downsizing and turbocharging without the performance disadvantage at certain low-speed operating conditions. Any improvement in launch performance may also be applied to naturally-aspirated engines.

SUMMARY

To adapt vehicle launch to the driving style of a particular operator, a vehicle is disclosed that has a brake system, including: brakes coupled to vehicle wheels; hydraulic lines coupled to the brakes, an actuation force on the brakes is related to pressure in the hydraulic lines; and a brake pressure sensor coupled to the hydraulic lines. The vehicle also has an internal combustion engine, an accelerator pedal, a vehicle speed sensor, and an electronic control unit (ECU) electronically coupled to the engine, the accelerator pedal, the vehicle speed sensor, and the pressure sensor. An incipient launch of the vehicle is determined when a vehicle speed sensor indicates that the vehicle is stopped and a signal signature from the pressure sensor indicates that brake pedal release is imminent. In response to an incipient launch, the ECU commands the throttle valve toward a more open position: changing a rate of change in the throttle opening or changing a magnitude of the more open position based on a launch interval between incipient launch and depression of the accelerator pedal as determined on prior launches of the vehicle.

In one embodiment, the vehicle also has a turbocharger coupled to the internal combustion engine and a wastegate coupled to an exhaust turbine of the turbocharger and electronically coupled to the ECU. The ECU commands the wastegate to close in response to the incipient launch.

To avoid an unintended launch, the ECU may command brake application in response to the throttle valve opening so that the vehicle remains stopped until the accelerator pedal is depressed.

In one embodiment, imminent brake pedal release is determined based on the pressure sensor indicating that pressure in the hydraulic system has dropped below a threshold pressure. Alternatively, imminent brake pedal release is determined based on a pressure decrease rate being greater than a threshold rate.

Also disclosed is a method to control an automotive vehicle having brake and accelerator pedals and a rotating propulsion system. A launch interval between an imminent brake pedal release and depression of the accelerator pedal is determined; at least one action to the vehicle to increase the rotation speed of the propulsion system is commanded; and the rate at which the at least one action is applied is based on the launch interval. The launch interval is based on an average of multiple, prior determinations of the launch interval between imminent brake pedal release and depression of the accelerator pedal. Imminent brake release may be based on a signal from a pressure sensor in a hydraulic line coupled to the brakes. The action is opening a throttle valve coupled to an engine intake; the rate at which action is applied is increased as the launch interval decreases.

In some embodiments, presence of a particular vehicle operator is detected so that the launch interval is associated with the particular operator. In such a case, the rate at which the action is applied is further based on the particular vehicle operator detected. In one embodiment, the operator detection is based on a code in a key fob. Alternatively, the operator detection is based on operator-specific adjustments communicated to the ECU. In yet another alternative, the operator detection is based on operator driving style. The launch interval is determined to be the shorter of: time between imminent brake pedal release and depression of the accelerator pedal and a predetermined maximum interval.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
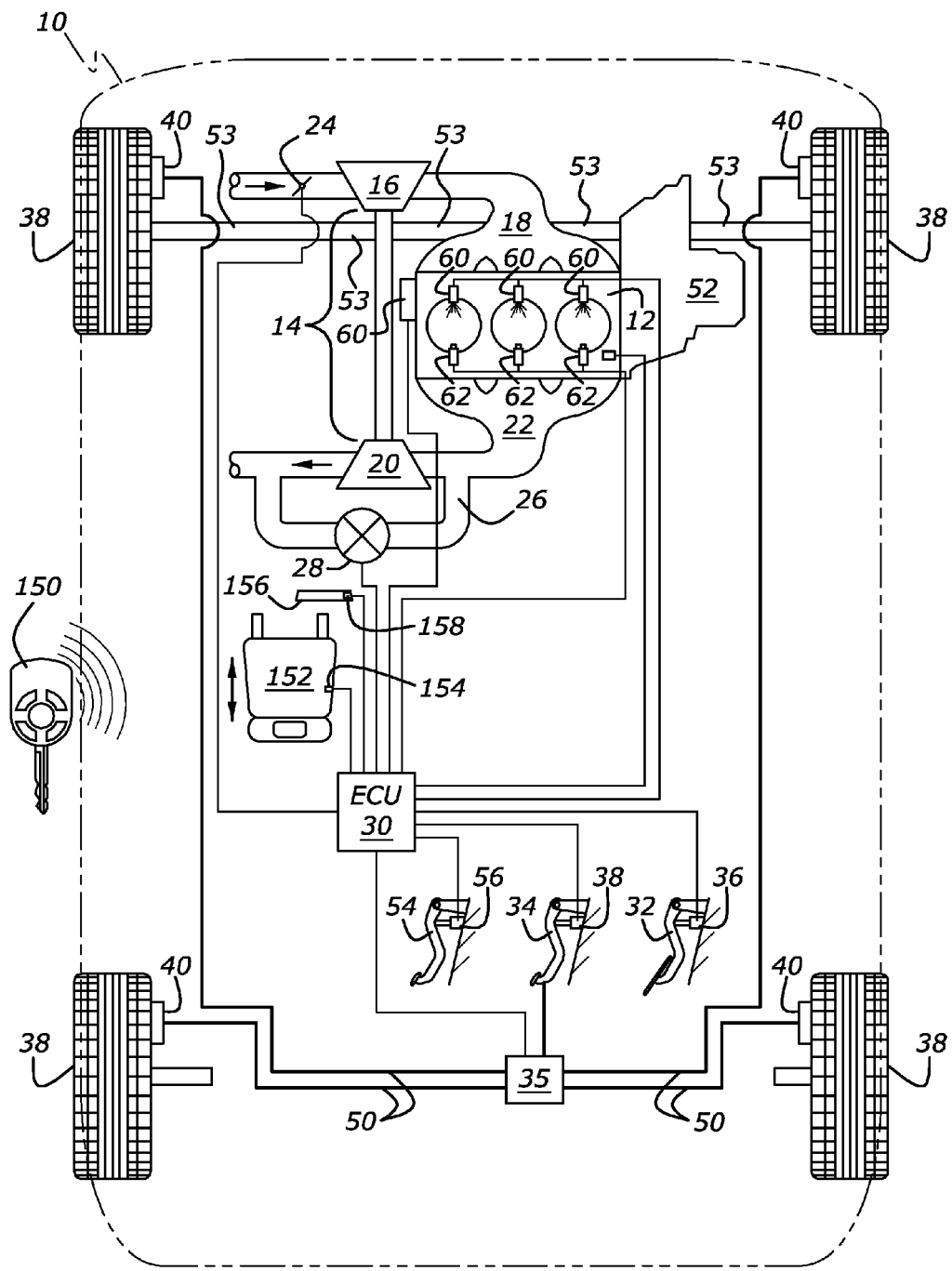
FIG. 1 is a schematic of a vehicle.

In FIG. 1, a vehicle 10 is illustrated that is used to describe several types of vehicle configurations. Not all components shown in FIG. 1 are included in each variation. For example, as described below, the transmission may be an automatic transmission or a conventional manual transmission, the former of which normally includes no clutch pedal, the latter of which does include a clutch pedal. In even other configurations, the transmission is a manual transmission with automatic shifting capability.

Vehicle 10 includes an internal combustion engine 12 with a turbocharger 14. Turbocharger 14 has an exhaust turbine 20 disposed in an exhaust duct 22 of engine 12; a compressor 16 disposed in an intake duct 18 of engine 12; and a shaft coupling turbine 20 and compressor 16. In intake duct 18 is a throttle valve 24 that is actuated under command of an electronic control unit (ECU) 30 to control flow of air into engine 12. A bypass duct 26 to turbine 20 has a valve 28 disposed therein that is actuated under control of ECU 30. Bypass duct 26 and valve 28 are commonly called a wastegate.

In the present disclosure, a single ECU 30 is shown in FIG. 1. However, this configuration is shown for convenience. It is understood that the functions described in reference to ECU 30 may be performed across multiple ECUs.

Vehicle 10 includes operator controls, such as an accelerator pedal 32 and a brake pedal 34, which the operator of the vehicle uses to indicate a desire for forward acceleration. Accelerator pedal 32 is coupled to a sensor 36 that communicates accelerator pedal 32 position to ECU 30. In conventional braking systems, brake pedal 34 is coupled to a brake booster 35 that connects to hydraulic lines and actuates calipers to clamp down on discs at the wheels 38. The operator actuates brake pedal 34 and such actuation is assisted by brake booster 35 to thereby actuate brakes 40 coupled to wheels 38 are actuated. In conventional braking systems, brakes 40 may be actuated independently of operator activity such as for roll stability control or electronic stability control. ECU 30 may command actuation of one or more brakes 40 to improve vehicle stability in response to destabilizing maneuvers or to prevent roll over of the vehicle. The ECU 30 can command a brake to act upon one of the vehicle wheels independent of the operator depressing a brake pedal. Some vehicles are equipped with electric brakes in which brake pedal 34 has a brake sensor 46 to detect operator input to brake pedal 34. The output of brake sensor 46 is provided to ECU 30; and ECU commands a pressure to apply to calipers of brakes 40 based on a signal from sensor 46. A pressure sensor 48 in brake booster 35 indicates the pressure acting upon brakes 40. Pressure sensor 48 is coupled to ECU 30. In such a brake-by-wire configuration, ECU 30 can also command the brakes to be applied to one or more wheels independent of an operator commanding braking by depressing the brake pedal.

Engine 10 is coupled to a transmission 52. In one embodiment, transmission 52 is an automatic transmission with a torque converter. The torque converter causes the vehicle to creep when transmission 52 is in gear and neither accelerator pedal 32 or brake pedal are depressed. In another embodiment, transmission 52 is a conventional manual transmission with a clutch (not individually shown in FIG. 1) coupled between engine 12 and transmission 52. The clutch is controlled by the operator of vehicle 10 by clutch pedal 54. In some embodiments, a clutch pedal sensor 56 may be coupled to clutch pedal 54. A signal from clutch pedal sensor 56 is coupled to ECU 30. In another alternative, transmission 52 is a dual clutch transmission (DCT) that is essentially two manual transmissions in one unit. Odd gears are coupled to one clutch and even gears are coupled to a second clutch. The transmission can be fully automatic with ECU 30 or gear selection is controlled by the vehicle operator. The clutches remain under control of ECU 30. In yet another alternative, transmission 52 is an automatic shifting manual (ASM) that is very much like a conventional manual transmission except that the clutch is under robotic control. The gears may be controlled by ECU 30 or by the vehicle operator. Transmission 52 is coupled to wheels 38 via a drive train including a shaft 53 coupled to vehicle wheels 38. The embodiment in FIG. 1 shows a two-wheel drive configuration. However, the present embodiment applies to any suitable configuration, such as, but not limited to, four-wheel drive vehicles.

Engine 10 has fuel injectors 60 which are coupled to engine cylinders, such as is the case with direct-injection gasoline or diesel engines. In port-injected, gasoline engine, fuel injectors are located in intake manifold 18. Pulse width and timing of the fuel injection is controlled via ECU 30. Fuel injectors 60 are supplied pressurized fuel from a fuel tank via at least one pump, the fuel system not shown in FIG. 1. In a gasoline engine, engine cylinders are also provided with spark plugs 62, the timing of which is controlled by ECU 30. Engine 12 is provided with a variable cam timing (VCT) device 64 to adjust the timing of the intake valves with respect to the piston position. Cam timing is controlled via ECU 30. In other embodiments, an exhaust VCT is provided, also.

Figure 2:
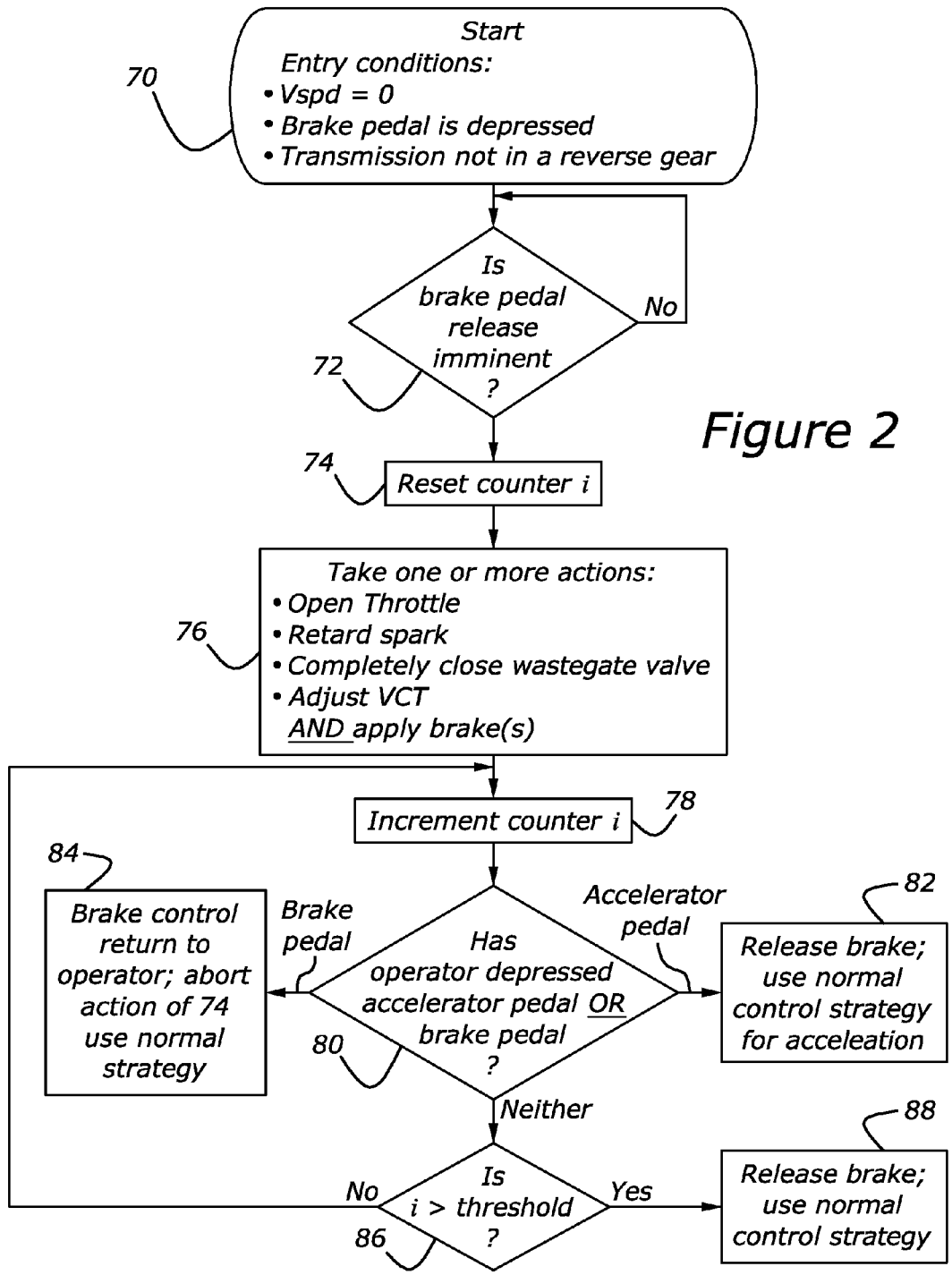
FIG. 2 is a flowchart of an algorithm for launching vehicles according to embodiments of the disclosure.

A flowchart illustrating an embodiment of the disclosure is shown in FIG. 2. The algorithm begins in 70 with entry conditions that vehicle speed is zero, i.e., the vehicle is stopped, that the vehicle operator is depressing brake pedal 34, and transmission 52 is not in a reverse gear. That is, launch performance enhancement is not used for backing up the vehicle. Control passes to decision block 72 in which it is determined whether brake pedal release is imminent. Such determination will be discussed in more detail below. If brake pedal release is not imminent, control remains in decision block 72 until the brake pedal is released or release is imminent, in which case control passes to 74 in which a counter, i, (or alternatively a timer) is reset. Control now passes to block 76 in which actions are taken to cause a greater exhaust enthalpy to be delivered to cause the exhaust turbine to spin up. Such actions may include one or more of: opening throttle valve 24, retarding spark timing, completely closing the wastegate valve 28 in the event that it is not already closed, adjusting the variable cam timing (VCT) system coupled to the engine. When the spark timing is retarded, the amount of torque produced by the engine decreases and the exhaust temperature rises. To counteract the drop in engine rpm that would accompany the torque drop, throttle valve 24 is opened further. In one embodiment, engine rpm is maintained at normal idle rpm. In one alternative, engine rpm is allowed to increase slightly, although not so much to alert an operator of the vehicle. In the embodiment, in which engine rpm is allowed to increase, a vehicle with an automatic transmission would creep forward at a greater rate than would otherwise be the case. To avoid an unexpected forward movement, a brake is applied in block 74 under control of ECU 30. In one embodiment, a brake is applied to at least one wheel to cause the vehicle speed to remain stationary. In another embodiment, the brake is applied to cause the vehicle to creep per a conventional strategy as with a vehicle with a torque converter. In embodiments with ASM or DCT transmissions, when the operator releases the brake pedal, a brake is applied under control of ECU 30 at least in situations where vehicle 10 is on an incline to thereby prevent roll back or roll forward. Typically, in embodiments with a conventional manual transmission, the vehicle operator controls the brakes by actuating the brake pedal. In some situations with a conventional manual transmission, the brake is not applied by ECU 30. In block 78, i is incremented. Control passes to decision block 80, in which it is determined whether the operator has depressed the brake pedal, the accelerator pedal, or neither. If the operator has depressed the accelerator pedal, the brake is released and normal operation ensues in block 82. If the operator has depressed the brake pedal, control passes to block 84 in which brake application by ECU 30 is released and is replaced by brake application due to brake pedal depression by the vehicle operator. Furthermore, actions in block 74 are aborted and normal strategy takes over. If neither are depressed, control passes to block 86 in which counter, i, is compared to a threshold. The actions taken in block 76 are intended to be temporary, e.g., for the 0.5 to 1 sec between the operator removing their foot from the brake pedal to the accelerator pedal to launch the vehicle, i.e., to anticipate the operator's intent to launch. However, for variety of reasons, the operator may not choose to launch, e.g., a car stalls or stumbles in front of them at a traffic light or in parking lot maneuvers. Thus, a counter, or alternatively a timer, is used to limit the predetermined time that the actions in 76 are allowed to run. The predetermined time may be in the range of 0.25 to 3 seconds, although such example is non-limiting. Thus, in decision block 86 if it is found that the counter has exceeded the threshold, control is passed to block 88 in which the normal idle strategy is employed is commanded, i.e., a strategy outside the scope of the present disclosure. If in decision block 86 it is found that the counter has not exceeded the threshold; actions in block 76 are allowed to continue.

Figure 3:
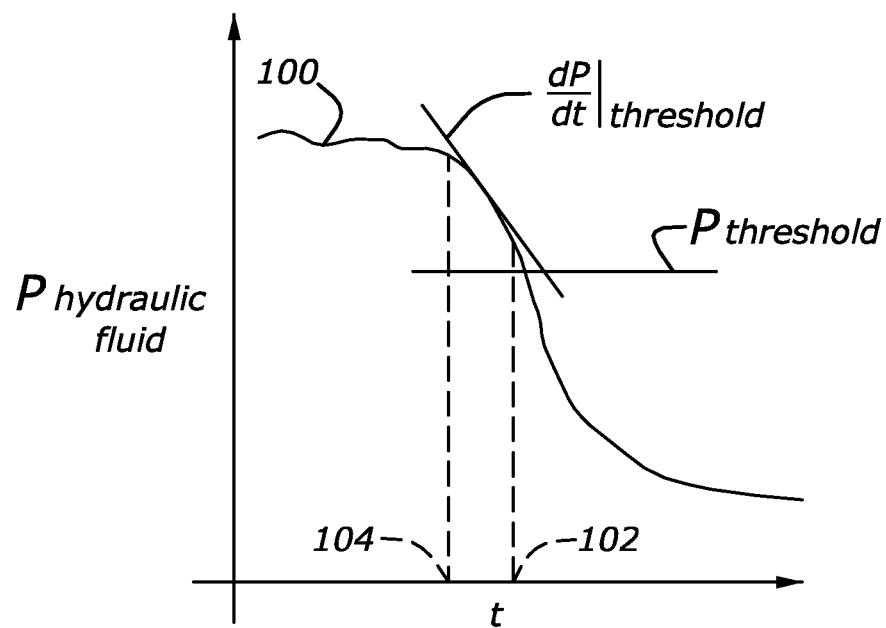
FIG. 3 is a graph of pressure in the hydraulic lines as a function of time during a brake release.

In decision block 72, a determination is made as to whether the brake pedal is being released. In one embodiment, the brake pedal is coupled to an on-off switch and coupled to brake lights on the exterior of the vehicle. When the brakes are determined to be off, the measure(s) to spin up the turbocharger are invoked. In vehicle embodiments that include a pressure sensor in the brake hydraulic lines, the actual release of the brakes may be anticipated by evaluating the signature of the pressure curve when the operator releases the brakes. An example of such a pressure curve as a function of time is shown as curve 100 in FIG. 3. In one embodiment, imminent release of the brake is based on the pressure dropping below a threshold pressure, in which case 102 indicates the time at which imminent brake release is determined and the measure(s) to spin up the turbocharger are invoked. In another embodiment, the measure(s) are based on the rate of decay, dP/dt, being below a threshold dP/dt. (Recall that dP/dt threshold in FIG. 2 is a negative number. Thus, the decay rate is exceeded when the decay rate is below, or more negative, than the threshold rate.) Imminent brake release is 104 for the example rate of decay determination in FIG. 2. To obtain a sufficiently robust derivative of pressure, suitable averaging, filtering, or other techniques may be employed to avoid false detection of imminent brake release.

Figure 4:
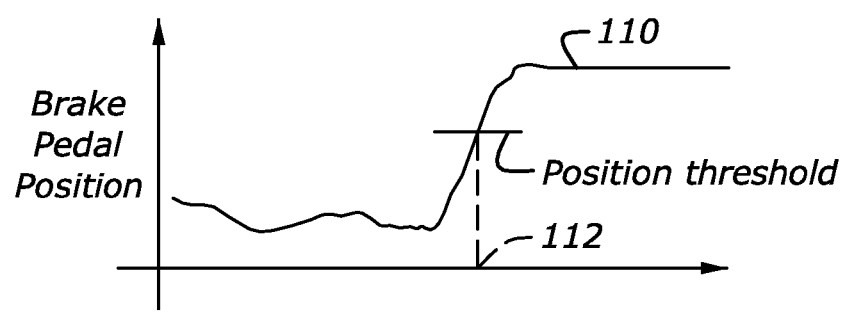
FIG. 4 is a graph of brake pedal position as a function of time during a brake release.

In yet another embodiment, a brake pedal position sensor is provided on the brake pedal. An example curve 110 is shown in FIG. 4 in which the brake is depressed at the left hand side of the graph. At some time later, the operator lifts their foot from the brake pedal and the signal from the position sensor indicates that the pedal rises. At a threshold position, imminent brake release is detected, and shown as occurring at time 112 in FIG. 4.

According to some embodiments of the disclosure, one or more measures are undertaken to spin up the turbocharger that are employed in the time between the operator providing an indication that they are releasing the brake and the time that their foot is on the accelerator pedal. Such interval of time is highly dependent on the driving style of the operator of the vehicle. Some drivers are very casual, releasing the brake and slowly moving their foot over to the accelerator pedal to begin acceleration. Other drivers are aggressive and perform the movement rapidly. The aggressiveness with which the measures to overcome turbocharger lag are employed may be based on the operator's driving style. For example, if the driver is aggressive, the time for spinning up the turbocharger is more limited than for a casual driver. In one embodiment, the measures taken to spin up the turbocharger are applied more aggressively. In some embodiments, the time for applying the measures, i.e., before aborting the measures is based on the expected time until the driver calls for a launch by depressing the accelerator pedal. For example, if the driver takes two seconds between providing an indication of releasing the brake pedal and actually depressing the accelerator pedal, it may be possible to merely open the throttle slightly, possibly with spark retard, to obtain the desired turbocharger speed increase. Also, the time threshold during which the measures are allowed to proceed without aborting the measures to spin up the turbocharger may be increased. That is, for a slower acting operator, the actions to bring the turbocharger to a higher speed may be applied longer in waiting for the operator to depress the accelerator pedal. Consequently, in one embodiment, the driving style of the driver, in regards to time to move from the brake pedal to the accelerator pedal, is determined and the thresholds and the measures associated with spinning up the turbocharger are altered accordingly.

In vehicles without a turbocharger, it is also helpful to prepare for a launch. For example, one of the delays in a naturally-aspirated, spark-ignition engine in providing a fast launch is manifold filling. That is, at idle, the pressure in the manifold may be in the range of negative one-third atmosphere. Bringing the pressure nearer atmospheric to obtain torque quickly at the wheels can take about 0.25 seconds. Launch response can be improved by at least that much by anticipating the operator's intention for a launch. That is, if the throttle valve in the intake is opened slightly prior to the operator depressing the accelerator pedal, the vehicle launch is faster. Retarding spark is not so important in a naturally aspirated engine to improve launch performance. However, it can be employed to bring exhaust aftertreatment devices, such as a three-way catalyst, to temperature in anticipation of an increased NOx engine out emission upon launch. Of course, upon the actual launch when the operator depresses the accelerator pedal, spark timing is advanced to provide the desired torque.

Figure 5:
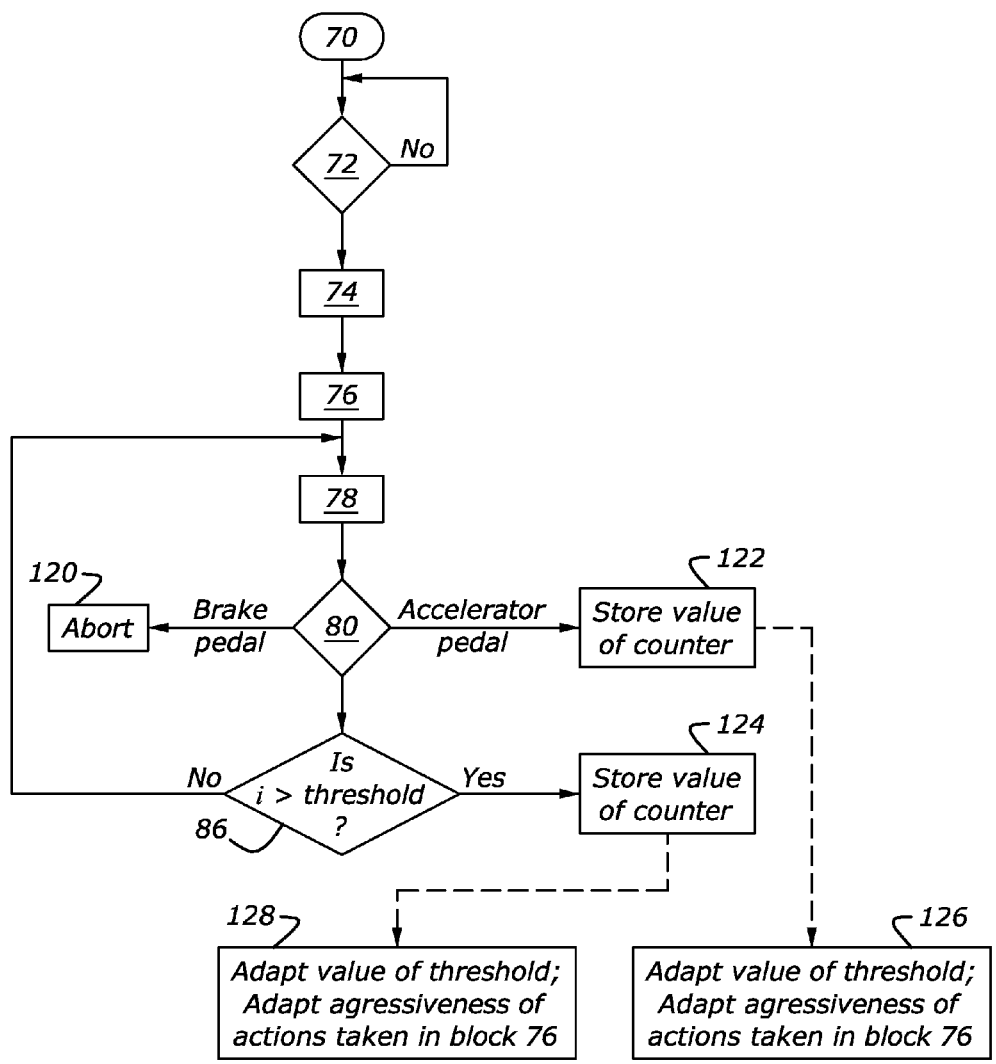
FIG. 5 is an adaptive routine according to an embodiment of the disclosure.

In the example adaptive routine shown in FIG. 5, many of the blocks are similar to those in FIG. 2. The identifying numerals of FIG. 2 are employed here for efficiency's sake. In block 80, in which actuation of brake pedal, accelerator pedal, or neither is queried. If the brake pedal is actuated, the routine of FIG. 5 is aborted in block 120. If the accelerator pedal is depressed, control passes to block 122 in which the value of the counter is stored. The value of the counter indicates the time that it takes for this vehicle operator to move their foot from the brake to the accelerator pedal. If neither pedal is depressed, control passes to block 86 in which it is determined whether the counter has exceeded the threshold. If not, the actions in 78 continue. If the threshold is exceeded by the counter in decision block 86, control passes to block 124 to store the value of the counter. If block 124 is accessed, the vehicle operator has not depressed a pedal in the time allotted for preparation for a launch. This could be due to the operator being a more casual driver and taking more time to call for a launch. Control passes from 124 to block 128 in which the value of the threshold may be adapted (increased) and the aggressiveness of the actions taken in block 76 reduced. From block 122, control passes to block 126 in which the value of the threshold may be adapted (decreased) and the aggressiveness of the actions taken in block 76 increased.

In FIG. 5, the algorithm shows a dashed link between blocks 122 and 126 and between blocks 124 and 128. According to one embodiment, the adaptations in blocks 126 and 128 are not performed for each time that a counter value is stored. Instead, multiple values of the counter are determined before adapting the routine. For example, a more aggressive driver may be in a parking lot and does not perform a launch. Thus, the counter exceeding the threshold does not indicate a change in the driver's general style, but a different driving scenario. Thus, adaptations in block 126 and 128 are performed after collecting data from multiple launches. Furthermore, the adaptation may be slowly invoked. E.g., if the last 10 launches have occurred with counter, i, well below the threshold, the threshold may be reduced in block 122. However, rather the reduction would be limited and only after several adaptations would the value of the threshold approach the value appropriate for the current driver. Of course, vehicle may have multiple drivers with varying driving styles. In such a case, the adaptations would adjust slowly for the current driver. Or, if the driver changes rapidly, little or no adaptation takes place as the values of the counter vary so widely so that no new direction is clearly indicated.

Different operators of the vehicle are likely to have varying driving styles. The launch interval, i.e., time from brake pedal release until accelerator pedal depression, may vary greatly from driver to driver. Thus, in some embodiments, a launch interval is determined for each operator, i.e., a launch interval is associated with each operator. The operator may be detected by the key fob 150 (as shown in FIG. 2) that is used. In one embodiment, adjustment of the driver's seat 152 as determined by a sensor 154 is used to distinguish among operators of the vehicle. Or, in another embodiment, sensor 154 is a weight sensor that can be used to distinguish among operators of the vehicle. Alternatively, position sensor 158 is coupled to a mirror 156 is used to detect a particular operator. In yet another embodiment, driving style, such as rate of depressing the accelerator pedal, aggressiveness of braking maneuvers, etc. are used to detect the driver of the vehicle.

If the launch interval is relatively short, the action or actions taken to prepare for the launch are undertaken more aggressively. In one embodiment, engine speed is increased during the launch interval. One action to increase engine speed is to open the throttle valve to a greater angle when the launch interval is shorter. In an alternative embodiment, the rate at opening the throttle valve can be greater when the launch interval is shorter.

In embodiments with a turbocharger coupled to the engine, it may be useful to retard the spark timing or injection timing to increase exhaust enthalpy to the turbocharger. The rate at which these actions are taken or the magnitude of the action are increased when the launch interval is decreased.

The term timer counter is used in reference to FIG. 2. In one embodiment, the algorithm is performed on a clocked basis, e.g., every 100 msec. In such a case, the counter is proportional to time and can be used directly. Alternatively, the counter should be related to real time so that the algorithm is not skewed by the time it takes to perform portions of the algorithm. In another alternative, a timer based on a clock is used in place of the counter.

Figure 6:
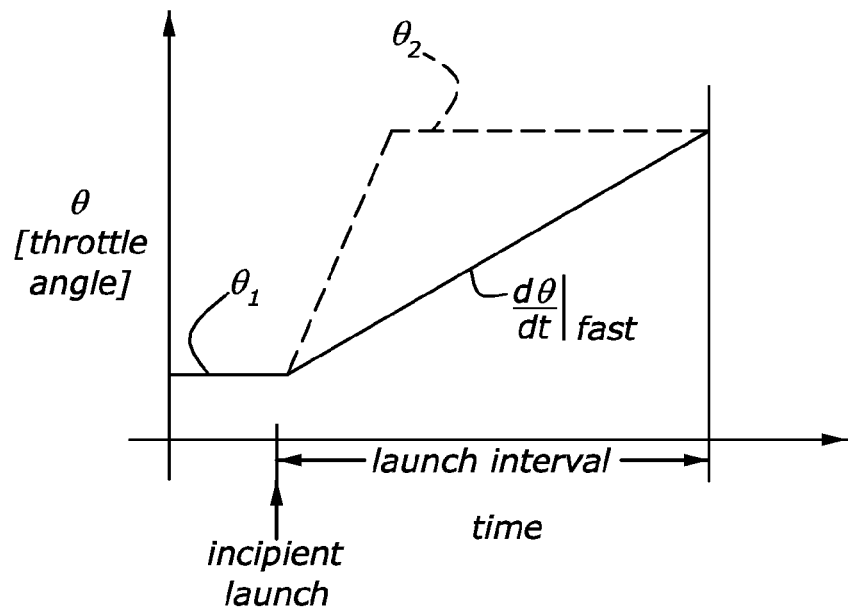
FIGS. 6 and 7 are plots of example applications of anticipating vehicle launch according to multiple embodiments of the disclosure.
Figure 7:
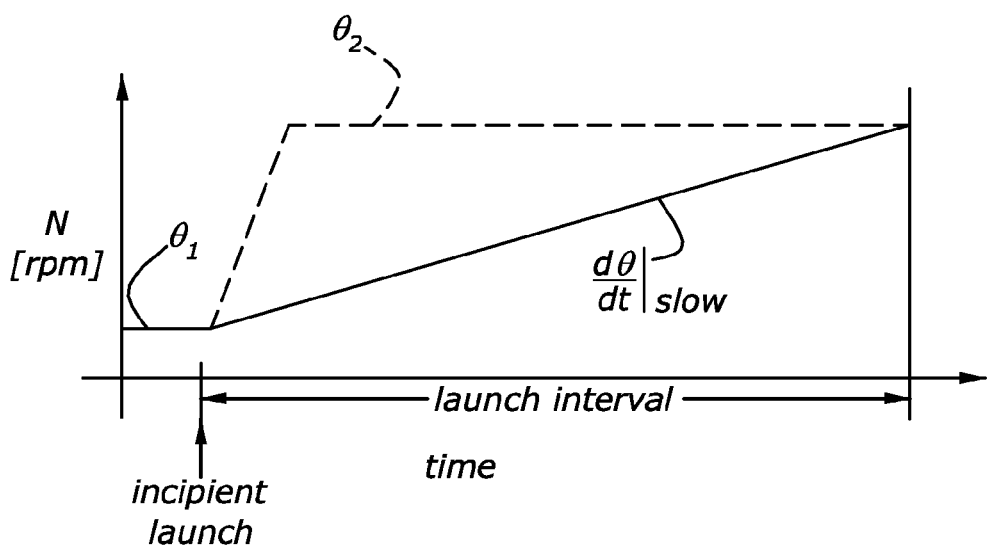

Referring to Figures and 7, two example launch intervals are shown, fast and slow, respectively. Before incipient launch, the throttle angle is at a first throttle angle, i.e., for normal engine idle. When incipient launch is detected, in one embodiment, the throttle valve is commanded more open to a second throttle angle, as shown by a dotted line. The second throttle angle is maintained until the end of the launch interval or until the operator of the vehicle intervenes by depressing on the accelerator pedal. Alternatively, the throttle valve is opened progressively over a period of time, shown as $d\theta/dt$, fast and $d\theta/dt$, slow in FIGS. 6 and 7, respectively. When it is known that the operator has a more rapid driving style, the throttle is opened more rapidly to sufficiently prepare for the launch, per FIG. 6. Conversely, the throttle is opened more slowly in FIG. 7. In some applications, it may be desirable to open the throttle more slowly to be less distracting to the operator of the vehicle. In other applications, it may be desirable to open the throttle directly to the desired position to ensure an aggressive launch feel. Or, in other applications, a combination may be employed.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A vehicle, comprising:
    a brake system, including: brakes coupled to vehicle wheels; hydraulic lines coupled to the brakes, an actuation force on the brakes being related to pressure in the hydraulic lines; and a brake pressure sensor coupled to the hydraulic lines;
    an internal combustion engine coupled to a turbocharger;
    a throttle valve controlling air flow into the internal combustion engine;
    an accelerator pedal coupled to the vehicle;
    a vehicle speed sensor; and
    an electronic control unit (ECU) electronically coupled to the engine, the throttle valve, the accelerator pedal, the vehicle speed sensor, and the pressure sensor, wherein:
        the ECU is configured to detect that the vehicle is stopped based on a signal from the vehicle speed sensor, is configured to detect that brake pedal release is imminent based on a signal signature from the pressure sensor, and is configured to detect an incipient launch of the vehicle when the vehicle speed sensor indicates that the vehicle is stopped and the signal signature from the pressure sensor indicates that the brake pedal release is imminent;
        in response to detecting an incipient launch, the ECU commands the throttle valve toward a more open position with at least one of: a rate of change in the throttle opening based on a launch interval between incipient launch and depression of the accelerator pedal and a magnitude of the more open position based on the launch interval between the incipient launch and the depression of the accelerator pedal; and
    a wastegate coupled to an exhaust turbine of the turbocharger and electronically coupled to the ECU, the ECU commanding the wastegate to close in response to the incipient launch.

2. The vehicle of claim 1, wherein the launch interval is based on at least one prior launch of the vehicle.

3. The vehicle of claim 1, wherein the ECU commands brake application in response to the throttle valve opening so that the vehicle remains stopped until the accelerator pedal is depressed.

4. The vehicle of claim 1, wherein imminent brake pedal release is detected by the ECU based on the pressure sensor indicating that pressure in the hydraulic system has dropped below a threshold pressure.

5. The vehicle of claim 1, wherein imminent brake pedal release is detected by the ECU based on a pressure decrease rate being greater than a threshold rate.

6. A method to control an automotive vehicle having brake and accelerator pedals and an internal combustion engine coupled to a turbo charger, comprising:
    detecting, by a vehicle speed sensor, that the vehicle is stopped based on a signal from the vehicle speed sensor; detecting, by a brake pressure sensor, that release of the brake pedal is imminent based on a signal from the brake pressure sensor; detecting, an incipient launch of the vehicle based on the detection that the vehicle is stopped and the detection that the release of the brake pedal is imminent; detecting, by an electronic control unit (ECU), a prior launch interval between the imminent brake pedal release and depression of the accelerator pedal; and
    commanding, by the ECU, at least one action to the vehicle to increase the rotation speed of the turbo charger during a subsequent launch interval, the rate at which the at least one action is applied during the subsequent launch interval being based on the prior launch interval.

7. The method of claim 6, wherein the subsequent launch interval is based on an average of multiple detections of prior launch intervals between imminent brake pedal release and depression of the accelerator pedal.

8. The method of claim 6, wherein the pressure sensor is located in a hydraulic line coupled to the brakes and the imminent brake release is based on a signal from the pressure sensor.

9. The method of claim 6, wherein the at least one action comprises opening a throttle valve coupled to an engine intake and the rate at which the at least one action is applied is increased as the prior launch interval decreases.

10. The method of claim 6, further comprising:
    detecting presence of a particular vehicle operator;
    associating the subsequent launch interval with the particular operator; and
    further basing the rate at which the at least one action is applied on the particular vehicle operator detected.

11. The method of claim 10, wherein the operator detection is based on a code in a key fob.

12. The method of claim 10, wherein the operator detection is based on operator-specific adjustments communicated to the ECU.

13. The method of claim 10, wherein the operator detection is based on operator driving style.

14. The method of claim 10, wherein the ECU detects a time between imminent brake pedal release and depression of the accelerator pedal, and the subsequent launch interval is the shorter of: the time between imminent brake pedal release and depression of the accelerator pedal, and a predetermined maximum interval.

15. A method to control an automotive vehicle having brake and accelerator pedals and an internal combustion engine coupled to a turbo charger, comprising:
    detecting, by an electronic control unit (ECU), a prior launch interval between brake pedal release and depression of the accelerator pedal;
    commanding, by the ECU, an action to increase engine speed during a subsequent launch interval, the action applied during the subsequent launch interval being based on the prior launch interval; and applying a brake to at least one wheel coupled to the vehicle during the subsequent launch interval to prevent forward movement of the vehicle due to the engine speed increase.

16. The method of claim 15, wherein the action comprises opening a throttle valve disposed in an engine intake and a magnitude of the opening is increased as the subsequent launch interval is decreased.

17. The method of claim 15, wherein the subsequent launch interval is based on an average of multiple detections of time between brake pedal release and depression of an accelerator pedal from prior launches.

18. The method of claim 15, further comprising: retarding a timing of fuel injection into engine cylinders.

* * * * *